United States Patent
Lee et al.

(10) Patent No.: US 11,657,230 B2
(45) Date of Patent: May 23, 2023

(54) REFERRING IMAGE SEGMENTATION

(71) Applicant: ADOBE INC., San Jose, CA (US)

(72) Inventors: Joon-Young Lee, San Jose, CA (US); Seonguk Seo, Seoul (KR)

(73) Assignee: ADOBE INC., San Jose, CA (US)

( * ) Notice: Subject to any disclaimer, the term of this patent is extended or adjusted under 35 U.S.C. 154(b) by 391 days.

(21) Appl. No.: 16/899,994

(22) Filed: Jun. 12, 2020

(65) Prior Publication Data

US 2021/0390700 A1    Dec. 16, 2021

(51) Int. Cl.
| | |
|---|---|
| *G06T 7/10* | (2017.01) |
| *G06F 40/30* | (2020.01) |
| *G06F 40/20* | (2020.01) |
| *G06F 16/9032* | (2019.01) |
| *G06F 17/16* | (2006.01) |
| *G06F 18/25* | (2023.01) |
| *G06V 20/70* | (2022.01) |

(52) U.S. Cl.
CPC ........ *G06F 40/30* (2020.01); *G06F 16/90332* (2019.01); *G06F 17/16* (2013.01); *G06F 18/25* (2023.01); *G06F 40/20* (2020.01); *G06T 7/10* (2017.01); *G06V 20/70* (2022.01); *G06T 2207/20081* (2013.01); *G06T 2207/20084* (2013.01)

(58) Field of Classification Search
CPC .... G06F 40/30; G06F 16/90332; G06F 17/16; G06F 18/25; G06F 40/20; G06F 40/169; G06T 7/10; G06T 2207/20081; G06T 2207/20084; G06V 20/70
See application file for complete search history.

(56) References Cited

U.S. PATENT DOCUMENTS

| | | | |
|---|---|---|---|
| 9,478,039 | B1 | 10/2016 | Wang et al. |
| 10,810,435 | B2 | 10/2020 | Lee et al. |

(Continued)

FOREIGN PATENT DOCUMENTS

| | | |
|---|---|---|
| CN | 100426719 C | 10/2008 |
| WO | 2015025189 | 2/2015 |
| WO | 2017112813 | 6/2017 |

OTHER PUBLICATIONS

Notice of Allowance dated Aug. 29, 2022 in corresponding U.S. Appl. No. 16/893,803.

(Continued)

*Primary Examiner* — Christopher M Brandt
(74) *Attorney, Agent, or Firm* — F. Chau & Associates, LLC

(57) ABSTRACT

A method, apparatus, and non-transitory computer readable medium for referring image segmentation are described. Embodiments of the method, apparatus, and non-transitory computer readable medium may extract an image feature vector from an input image, extract a plurality of language feature vectors for a referral expression, wherein each of the plurality of language feature vectors comprises a different number of dimensions, combine each of the language feature vectors with the image feature vector using a fusion module to produce a plurality of self-attention vectors, combine the plurality of self-attention vectors to produce a multi-modal feature vector, and decode the multi-modal feature vector to produce an image mask indicating a portion of the input image corresponding to the referral expression.

20 Claims, 8 Drawing Sheets

(56) References Cited

U.S. PATENT DOCUMENTS

| | | | |
|---|---|---|---|
| 10,936,912 B2 | 3/2021 | Nakano et al. | |
| 2017/0127046 A1 | 5/2017 | Das | |
| 2018/0108137 A1* | 4/2018 | Price | G06N 3/08 |
| 2018/0197294 A1 | 7/2018 | Pan et al. | |
| 2019/0311202 A1 | 10/2019 | Lee et al. | |
| 2020/0090316 A1 | 3/2020 | Man et al. | |
| 2020/0175324 A1 | 6/2020 | Takahashi et al. | |
| 2021/0027098 A1 | 1/2021 | Ge et al. | |
| 2021/0279527 A1 | 9/2021 | Zadeh et al. | |
| 2022/0366603 A1* | 11/2022 | Piao | G06V 10/225 |

OTHER PUBLICATIONS

Andrew Brock, et al. "Large Scale Gan Training for High Fidelity Natural Image Synthesis", In ICLR, 2019, 35 pages.
Kaiming He, et al. "Mask R-CNN", In CVPR, 2017, 9 pages.
Ronghang Hu, et al. "Segmentation From Natural Language Expressions", In ECCV, 2016, 25 pages.
Philipp Krähenbühl, et al. "Efficient Inference in Fully Connected CRFS With Gaussian Edge Potentials", In NIPS, 2011, 9 pages.
Ruiyu Li, et al. "Referring Image Segmentation Via Recurrent Refinement Networks", In CVPR, 2018, 9 pages.
Xingyu Liao, et al., "Video-Based Person Re-Identification Via 3D Convolutional Networks and Non-Local Attention", In ACCV, 2018, 9 pages.
Tsung-Yi Lin, et al., "Microsoft COCO: Common Objects in Context", In ECCV, 2014, 15 pages.
Chenxi Liu, et al., "Recurrent Multimodal Interaction for Referring Image Segmentation", In SCCV, 2017, 10 pages.
Ding Liu, et al., "Non-Local Recurrent Network for Image Restoration", In NIPS, 2018, 10 pages.
Junhua Mao, et al., "Generation and Comprehension of Unambiguous Object Descriptions", In CVPR, 2016, 10 pages.
Edgar Margffoy-Tuay, et al., "Dynamic Multimodal Instance Segmentation Guided by Natural Language Queries", In ECCV, 2018, 16 pages.
Varun K Nagaraja, et al., "Modeling Context Between Objects for Referring Expression Understanding", In ECCV, 2016, 16 pages.
Jiangmiao Pang, et al., "Libra R-CNN: Towards Balanced Learning for Object Detection", In CVPR, 2019, 10 pages.
Hengcan Shi, et al., "Key-Word-Aware Network for Referring Expression Image Segmentation", In Proceedings of the European Conference on Computer Vision (ECCV), pp. 38-54, 2018, 17 pages.
Nitish Srivastava, et al., "Dropout: A Simple Way to Prevent Neural Networks From Overfitting", The journal of machine learning research, 15(1):1929-1958, 2014, 30 pages.
Ashish Vaswani, et al., "Attention is All You Need", In NIPS, 2017, 11 pages.
Xiaolong Wang, et al., "Non-Local Neural Networks", In CVPR, 2018, 10 pages.
Linwei Ye, et al., "Cross-Modal Self-Attention Network for Referring Image Segmentation", In CVPR, 2019, 10 pages.
Licheng Yu, et al., "MAttNet: Modular Attention Network for Referring Expression Comprehension", In CVPR, 2018, 9 pages.
Anna Khoreva, et al., "Video Object Segmentation With Language Referring Expressions", In ACCV, 2018, 24 pages.
Arnaud Benard, et al. "Interactive Video Object Segmentation in the Wild", arXiv preprint arXiv:1801.00269, 2017, 7 pages.
Chenliang Xu, et al., "Can Humans Fly? Action Understanding With Multiple Classes of Actors", In CVPR, 2015, 10 pages.
Chenyou Fan, et al., "Heterogeneous Memory Enhanced Multimodal Attention Model for Video Question Answering", In CVPR, 2019, 9 pages.
Federico Perazzi, et al., "A Benchmark Dataset and Evaluation Methodology for Video Object Segmentation", In CVPR, 2016, 9 pages.
Federico Perazzi, et al., "Learning Video Object Segmentation From Static Images", In CVPR, 2017, 10 pages.
Hueihan Jhuang, et al., "Towards Understanding Action Recognition", In CVPR, 2013, 8 pages.
Kirill Gavrilyuk, et al., "Actor and Action Video Segmentation From a Sentence", In CVPR, 2018, 9 pages.
Linjie Yang, et al., "Efficient Video Object Segmentation Via Network Modulation", In CVPR, 2018, 9 pages.
Ning Xu, et al., "Youtube-VOS: Sequence-To-Sequence Video Object Segmentation", In ECCV, 2018, 17 pages.
Paul Voigtlaender, et al., "FEELVOS: Fast End-To-End Embedding Learning for Video Object Segmentation", In CVPR, 2019, 10 pages.
Seoung Wug Oh, et al., "Fast User-Guided Video Object Segmentation by Interaction-and-Propagation Networks", In CVPR, 2019, 10 pages.
Seoung Wug Oh, et al., "Fast Video Object Segmentation by Reference-Guided Mask Propagation", In CVPR, 2018, 10 pages.
Seoung Wug Oh, et al., "Video Object Segmentation Using Space-Time Memory Networks", In ICCV, 2019, 10 pages.
Sergi Caelles, et al. "THE 2018 Davis Challenge on Video Object Segmentation", arXiv preprint arXiv:1803.00557, 2018, 4 pages.
Sergi Caelles, et al., "One-Shot Video Object Segmentation", In CVPR, 2017, 10 pages.
Vikash Goel, et al. "Unsupervised Video Object Segmentation for Deep Reinforcement Learning", In NIPS, 2018, 12 pages.
Wenguan Wang, et al., "Learning Unsupervised Video Object Segmentation Through Visual Attention", In CVPR, 2019, 11 pages.
Xiaoxiao Li, et al., "Video Object Segmentation With Joint Re-Identification and Attention-Aware Mask Propagation", In ECCV, 2018, 16 pages.
Xihui Liu, et al, "Improving Referring Expression Grounding With Cross-Modal Attention-Guided Erasing", In CVPR, 2019, 10 pages.
Yuhua Chen, et al., "Blazingly Fast Video Object Segmentation With Pixel-Wise Metric Learning", In CVPR, 2018, 10 pages.
Zhenyang Li, et al., "Tracking by Natural Language Specification", In CVPR, 2017, 9 pages.
First Action Interview Pilot Program Pre-Interview Communication dated Feb. 3, 2022 in related U.S. Appl. No. 16/893,803.
Final Office Action dated Jun. 17, 2022 in corresponding U.S. Appl. No. 16/893,803.

* cited by examiner

600

605

REFERRING IMAGE SEGMENTATION

BACKGROUND

The following relates generally to image processing, and more specifically to referring image segmentation.

Given an input image and a referral expression (e.g., in the form of a natural language query), the task of segmenting the object of interest in the image referred by the linguistic query is known as 'referring image segmentation'. Referring image segmentation has applications in areas such as image retrieval and search, image synthesis and editing, and human-computer interactions. In some cases, neural networks may be used to bridge attention across vision and language to perform referring image segmentation tasks.

In some cases, referring image segmentation networks produce inaccurate estimates of a target object, or utilize significant post-processing to achieve clean and accurate results. Therefore, there is a need in the art for systems and methods to produce accurate referring image segmentation with minimal post-processing.

SUMMARY

A method, apparatus, and non-transitory computer readable medium for referring image segmentation are described. Embodiments of the method, apparatus, and non-transitory computer readable medium may include receiving an input image and a referral expression corresponding to a target object in the input image; generating an image mask corresponding the target object based on an image feature vector representing the input image and a plurality of language feature vectors representing the referral expression, wherein each of the plurality of language feature vectors comprises a different number of dimensions; and displaying the target object by overlaying the image mask on the input image.

A method, apparatus, and non-transitory computer readable medium for referring image segmentation are described. Embodiments of the method, apparatus, and non-transitory computer readable medium may identify training data comprising a plurality of training elements, wherein each of the plurality of training elements comprises an input image, a referral expression, and an image mask, extract an image feature vector for the input image in each of the plurality of training elements, extract a plurality of language feature vectors for the referral expression corresponding to the input image, wherein each of the plurality of language feature vectors comprises a different number of dimensions, combine each of the language feature vectors with the image feature vector using a multimodal self-attention network module to produce a plurality of self-attention vectors, exclude a self-attention vector of the plurality of self-attention vectors based on a random selection, combine the plurality of self-attention vectors except for the excluded self-attention vector to produce a multi-modal feature vector, and decode the multi-modal feature vector to produce a predicted image mask.

An apparatus and method for referring image segmentation are described. Embodiments of the apparatus and method may include a language feature extractor configured to extract an image feature vector from an input image, an image feature extractor configured to extract a plurality of language feature vectors for a referral expression, wherein each of the plurality of language feature vectors comprises a different number of dimensions, a fusion module configured to combine each of the language feature vectors with the image feature vector to produce a plurality of self-attention vectors and to combine the plurality of self-attention vectors to produce a multi-modal feature vector, and a decoder configured to decode the multi-modal feature vector to produce an image mask indicating a portion of the input image corresponding to the referral expression.

DETAILED DESCRIPTION

The present disclosure relates to referring image segmentation. The term "referring image segmentation" refers to the task of identifying an image mask corresponding to one or more objects among a plurality of objects in an image based on a natural language expression. The mask includes a set of pixels that correspond to the target object in the image.

Embodiments of the disclosure generate an image mask by extracting image features from an input image and extracting multiple language feature vectors based on the referral expression. The different language feature vectors may be distinguished based on each of them having a different number of dimensions. The image features may then be combined with each of the language feature vectors to produce multiple multi-modal feature vectors, which can be combined before decoding them to produce the image mask. Certain embodiments provide a stochastic attentive fusion network that can extract comprehensive, long-range multi-modal representations for referring image segmentation tasks.

In an example of a referring image segmentation task, a user provides a natural language expression for a target object in an image. A referring image segmentation system, such as an artificial neural network (ANN), then generates an image mask for the object. The mask includes a set of pixels that correspond to the target object. The mask may be used for applications such as image search, synthesis and editing.

Conventional referring image segmentation systems often produce inaccurate results that require significant post-processing to provide a suitable image mask. For example, some methods of referring image segmentation focus on the most dominant words and regions of an image while neglecting potentially meaningful multi-modal interactions useful for accurate visual-lingual alignments. That is, different words in a referral expression may correspond to different pixels in an image. For example, in the referral expression "a man in a red hat," the term "man" may correspond to one set of features, and the term "red hat" may correspond to another set of features in an image.

Figure 3:
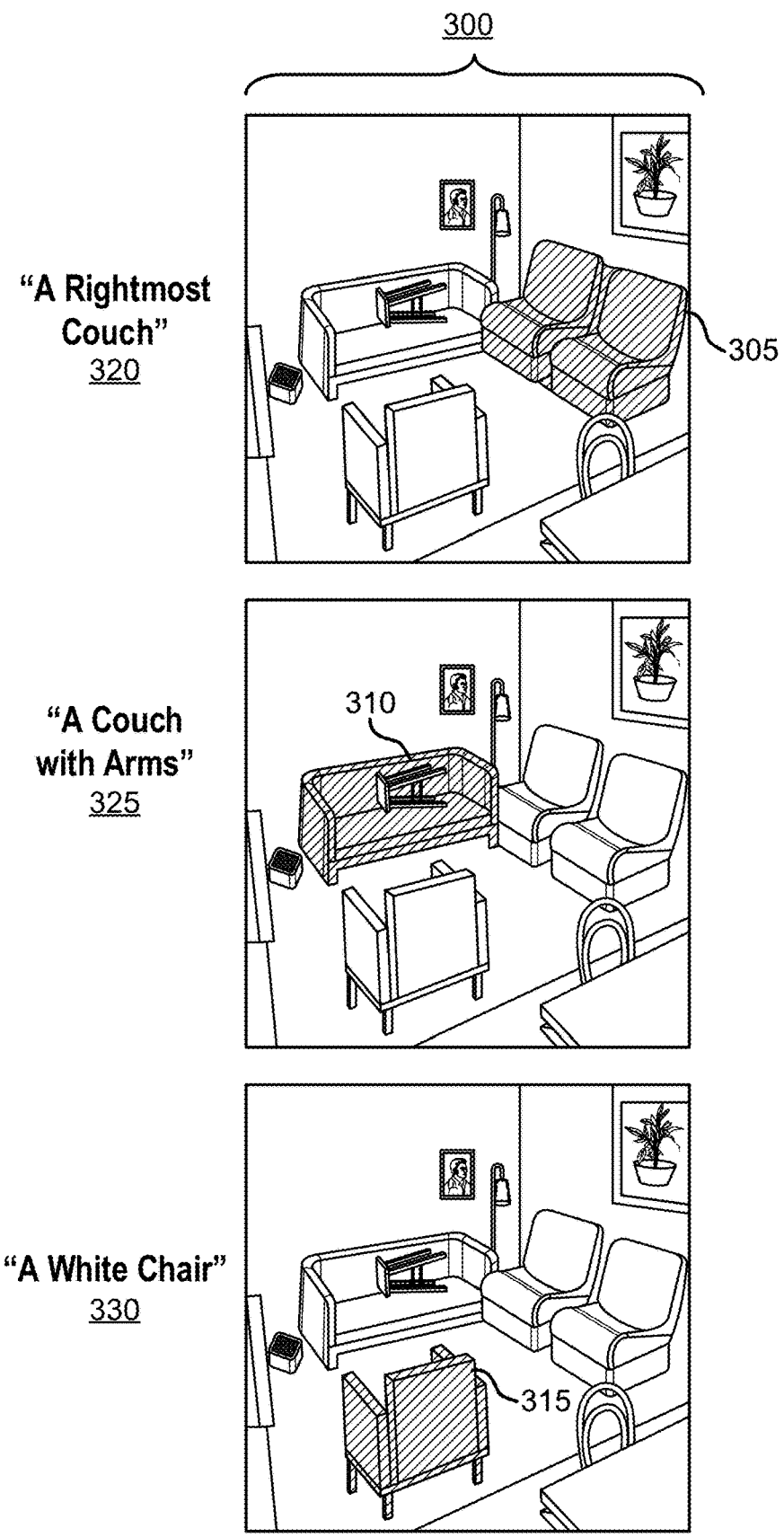
FIG. 3 shows an example of image annotation based on language queries according to aspects of the present disclosure.
Figure 6:
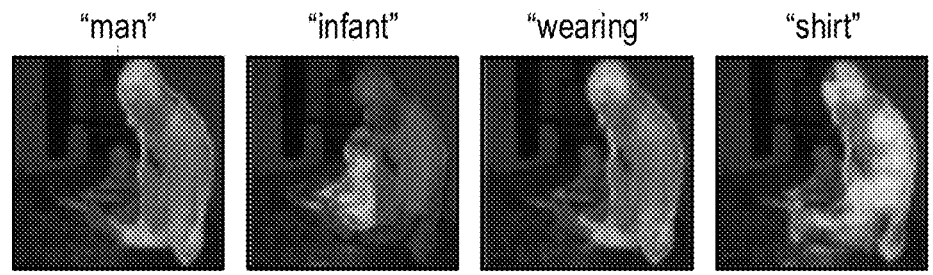
FIG. 6 shows an example of interpretation information according to aspects of the present disclosure.
Figure 6:
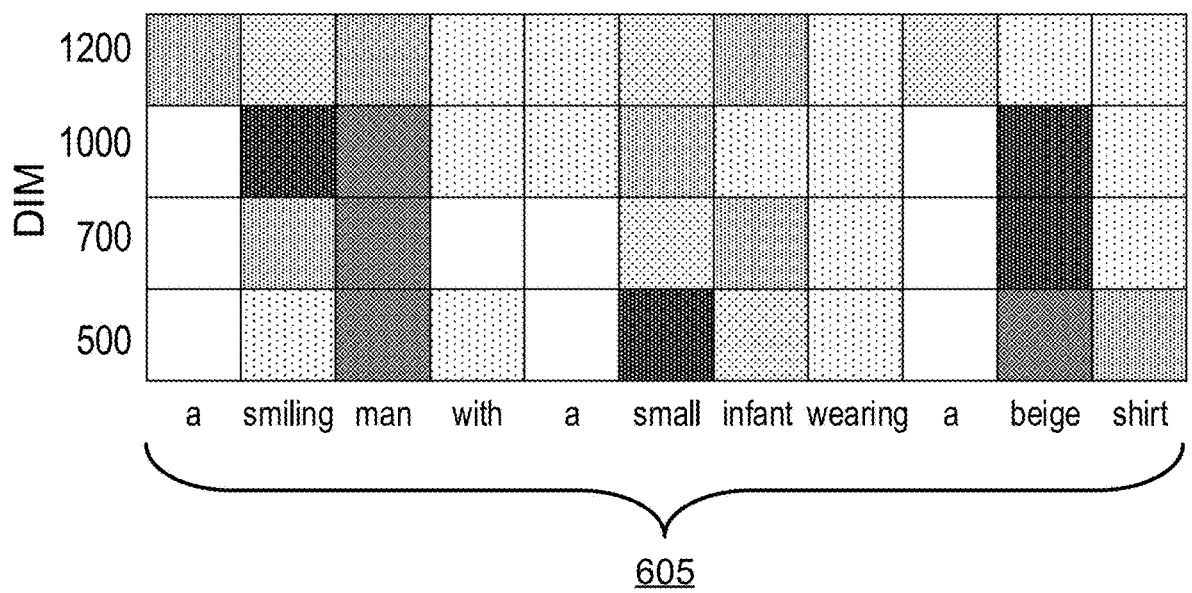

Multi-modal interactions become more pronounced when an image includes several similar objects (as illustrated in FIG. 3, which includes an image with several kinds of furniture), when the referral expression is complex (as illustrated in FIG. 6, which includes a referral expression with multiple elements, e.g., a girl and a brown outfit), or both.

Embodiments of the present disclosure provide a multi-modal (i.e., language and image) attention method that can discover latent relationships between images and texts. In some cases, self-attended multi-modal embeddings are fused in a stochastic manner. For example, a referring image segmentation system may generate multiple language representations, and one or more of the representations can be dropped during training to prevent the model from overfitting, and to enlarge the model capacity.

According to various examples, a self-attention module may be implemented based on a two-stage modeling, corresponding to a stage including modality-specific self-attention modules (i.e., for language and image modalities) and a stage including a fusion module. The described self-attention modules may be effective in identifying complex, long-range dependency between the two modalities. Some embodiments employ a balanced feature pyramid structure in a decoder to strengthen feature semantics and refine the quality of segmentation.

Thus, embodiments of the present disclosure provide referring image segmentation results having greater accuracy without post-processing. The described methods of stochastic regularization can also reduce training time. The described embodiments can provide accurate segmentation information given images with multiple similar objects, and given complex referral expressions.

System Overview

Figure 1:
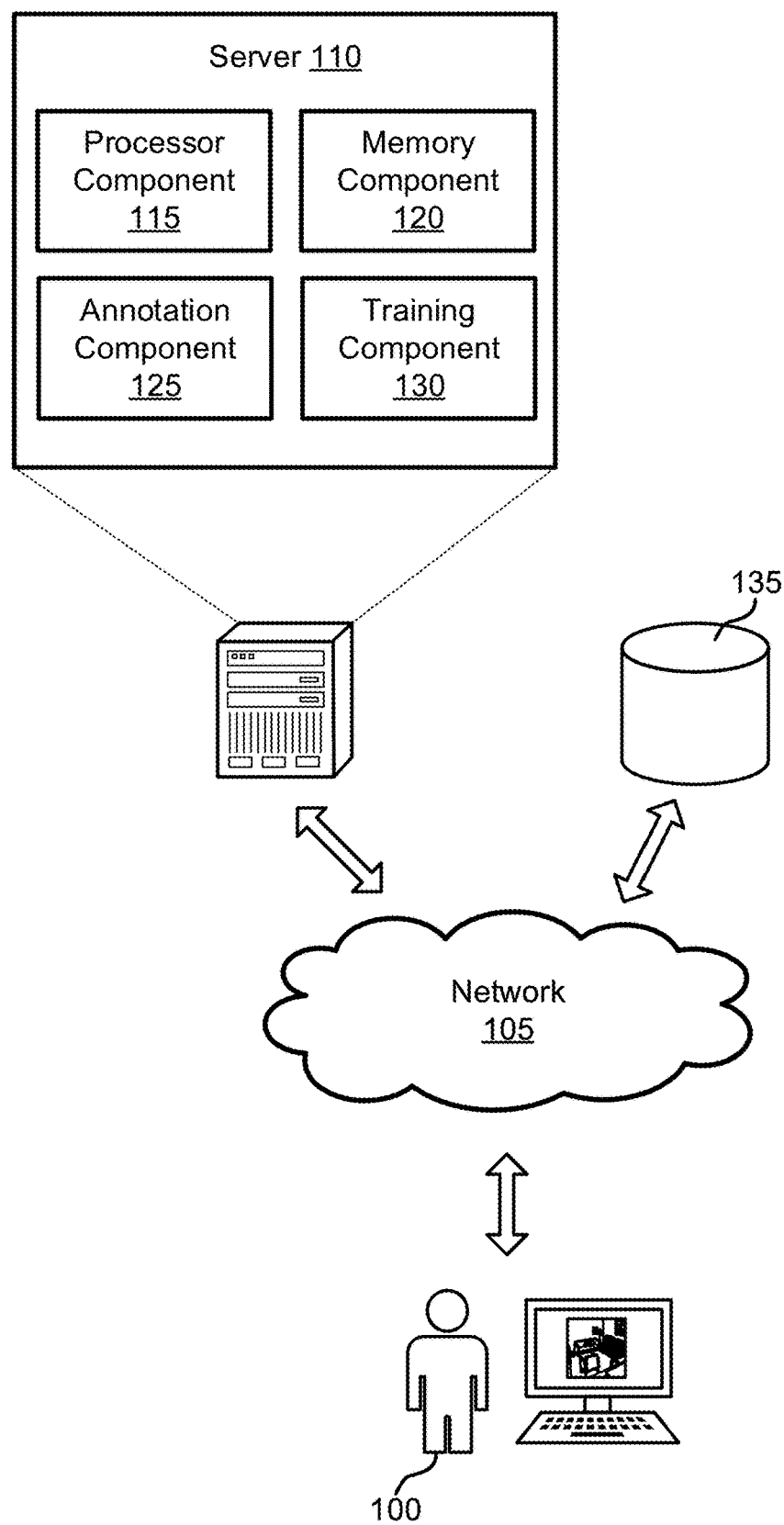
FIG. 1 shows an example of a system for image processing according to aspects of the present disclosure.

FIG. 1 shows an example of a system for image processing according to aspects of the present disclosure. The example shown includes user 100, network 105, server 110, and database 135. Server 110 may be an example of, or include aspects of, the corresponding element or elements described with reference to FIG. 4. Server 110 may include processor component 115, memory component 120, annotation component 125, and training component 130.

Given an input image and a natural language expression from the user 100, the described referring image segmentation network (which may be implemented on server 110) may segment out an object referred by the natural language expression within the input image. User 100 may communicate with the server 110 via network 105. In some cases, database 135 may store images and referral expressions. For example database 135 may store images for search and retrieval, or for training the referring image segmentation network. Here, the term "referral expression" refers to a natural language expression corresponding to an object in an image. The referral expression could come from a natural language query or command provided by a user. For example, in an image portraying an adult playing ball with a child, 'a child holding a ball' can be a referral expression.

A referring image segmentation task estimates a segmentation mask of a target object referred by natural language expressions. This task has applications in areas such as image retrieval and search, image synthesis and editing, and human-computer interactions. Compared to visual question answering and image captioning, a referring image segmentation task may depend on a more sophisticated semantic understanding of both vision and language inputs and generation of high-quality pixel-level outputs.

Thus, embodiments of the present disclosure take an input image and a language expression and extracts visual and lingual features from each of them. Both the features are used to construct a joint multi-modal feature representation. To effectively merge visual and lingual information, stochastic multi-modal self-attention is applied to the multi-modal feature. Then, the self-attentive multi-modal feature is passed to a balanced feature pyramid network and a multi-scale decoder in order. The outputs are up-sampled and combined together to obtain a final segmentation mask of the target object. Here, the term "multi-modal" refers to a data representation or network layer that is based on multiple modes of data. For example, multi-modal may refer to the use of language and image data (e.g., such as a referral expression corresponding to portions of an image).

In some cases, long short term memory (LSTM) and convolutional neural network (CNN) layers may be exploited to extract and concatenate visual and linguistic features. Referring image segmentation tasks may apply a large-scale dataset and a unified framework of generation and comprehension of language expressions. A convolutional LSTM may enhance sequential interactions between multi-modal features.

In some examples, dynamic convolution filters given by language features may improve cross-modal interactions. Feature pyramid structures may be applied to take advantage of multi-scale semantics for referring image segmentation and refine segmentation masks in a progressive manner. A modular attention network may decompose cross-modal reasoning into a subject, object and relationship modules and exploits visual and textual attention to focus on relevant cross-modal alignments. Cross-modal self-attentive features may capture long-range correlations between visual and linguistic modalities in order to bridge attentions across vision and language.

In some cases, self-attention modules are employed to perform a sequence modeling of natural language expressions. The language expressions are then combined with the visual features. However, self-attention modules may not be sufficient for less noticeable objects where concrete descriptions for specific reference and sophisticated representations for accurate segmentation are in place. Here, the term "self-attention" refers to a machine learning model in which representations of the input interact with each other to determine attention weights for the input. Self-attention can be distinguished from other attention models because the attention weights are determined at least in part by the input itself.

One embodiment of the present disclosure describes a deep neural network with stochastic learning, which models complex relationship between images and texts. The described network encodes referral expressions using multiple embeddings and applies a stochastic multi-modal attention to discover comprehensive alignments between visual semantics and language semantics. In addition, a balanced feature pyramid network may be incorporated into a decoder to strengthen the semantic features and improve the quality of output segmentation masks.

Embodiments of the present disclosure include a two-stage multi-modal self-attention network to identify cross-modal semantic alignments effectively for referring image segmentation. One embodiment provides stochastic multi-scale multi-modal embedding features that can capture long-range dependencies within joint representations of vision and language semantics. Methods and systems described herein improve performance on the benchmark datasets without a post-processing step.

Accordingly, server 110 may include an artificial neural network (ANN). An ANN may be a hardware or a software component that includes a number of connected nodes (a.k.a., artificial neurons), which may loosely correspond to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

In some examples, the ANN may include a CNN. A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In some examples, the ANN may also include a self-attention mechanism. An attention mechanism is a method of placing differing levels of importance on different elements of an input. Calculating attention may involve three basic steps. First, compute the similarity between query and key vectors obtained from the input to generate attention weights. Similarity functions may include dot product, splice, detector, etc. Next, use a softmax function to normalize the weights. Finally, weigh the attention weights in together with the corresponding values. A self-attention mechanism is an attention mechanism in which representations of the input interact with each other to determine attention weights for the input.

For example, in computer vision and natural language processing, repeated operations over a whole sequence may be used to maintain a long-range dependency, which is computationally complex. To address this issue, machine translation tasks may implement a self-attention mechanism to compute a response at every location using a weighted average of features at all locations in a preceding layer. A non-local neural network, which adapts self-attention to convolutional neural networks, may achieve good performance in video classification. A single non-local module may expand the receptive field to a whole input image, which is effective in strengthening high-level semantics in the features. In some cases, a single non-local module is implemented in various computer vision tasks and achieves performance gains in applications such as object detection, video person re-identification, image restoration, and image generation.

In some examples, the ANN may include a recurrent neural network (RNN). An RNN is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph).

Embodiments of the present disclosure may also include an LSTM component. An LSTM is a form of RNN that includes a cell, an input gate, an output gate and a forget gate. The cell stores values for a certain amount of time, and the gates dictate the flow of information into and out of the cell. LSTM networks may be used for making predictions based on series data where there can be gaps of unknown size between related information in the series. LSTMs can help mitigate the vanishing gradient (and exploding gradient) problems when training an RNN.

Embodiments of the present disclosure may also include a ResNet. A ResNet is a neural network architecture that addresses issues associated with training deep neural networks. It operates by including identity shortcut connections that skip one or more layers of the network. In a ResNet, stacking additional layers doesn't degrade performance or introduce training errors because skipping layers avoids the vanishing gradient problem of deep networks. In other words, the training gradient can follow "shortcuts" through the deep network.

Embodiments of the present disclosure may also include a Feature Pyramid Network (FPN). An FPN is a feature extractor that generates multiple feature map layers (multi-scale feature maps) for object detection. Each feature map layer corresponds to a different resolution. That is, each layer of the feature pyramid represents the image feature using an array with a different number of values.

A processor component 115 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into the processor. The processor may be configured to execute computer-readable instructions stored in a memory to perform various functions. In some examples, the processor component 115 may comprise a system-on-a-chip.

A memory component 120 may store information for various programs and applications on a computing device. For example, the storage may include data for running an operating system. The memory may include both volatile memory and non-volatile memory. Volatile memory may include random access memory (RAM), and non-volatile memory may include read-only memory (ROM), flash memory, electrically erasable programmable read-only memory (EEPROM), digital tape, a hard disk drive (HDD), and a solid state drive (SSD). Memory may include any combination of readable and/or writable volatile memories and/or non-volatile memories, along with other possible storage devices.

Annotation component 125 applies a visual indicator (i.e., annotation information) to the input image based on an image mask, where the visual indicator corresponds to an object in the referral expression. Here, the "image mask" refers to annotation information for an image indicating which pixels or regions of an image correspond to an object. For example, the image mask could indicate which portion of an image corresponds to an object identified by a referral expression.

Training component 130 identifies training data including a set of training elements, where each of the set of training elements includes an input image, a referral expression, and an image mask. Training component 130 updates the ANN based on comparing predicted segmentation data with ground truth segmentation data.

Figure 2:
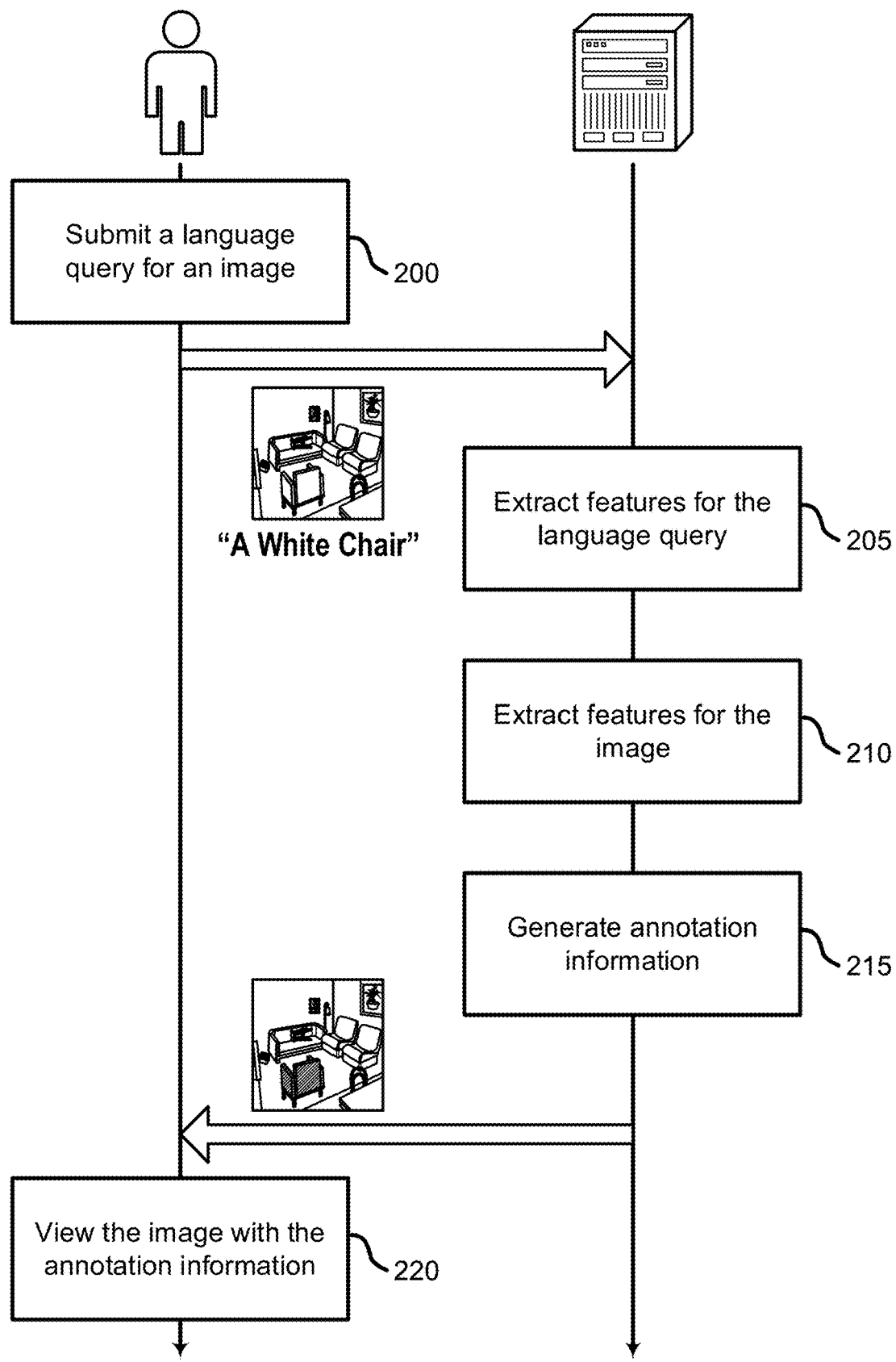
FIG. 2 shows an example of an image processing flow according to aspects of the present disclosure.

FIG. 2 shows an example of an image processing flow according to aspects of the present disclosure. In some examples, these operations may be performed by a system including a processor executing a set of codes to control functional elements of an apparatus. For example, the operations of FIG. 2 may be performed by the system described with reference to FIG. 1.

Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 200, the user submits a language query for an image. In some cases, the user also provides the image itself. The language query may correspond to an object in the image that the user wants to identify. For example, as shown in operation 200, the user may provide an image of a room and provide an expression (e.g., "a white chair") corresponding to an object that the user wishes to identify or select in the image.

At operation 205, the system extracts features for the language query. For example, each word in a language expression may be encoded as a one-hot vector and projected onto an embedding space using a learnable lookup table. Here, the term "embedding space" refers to a vector space representing the meaning of words or phrases. In some cases, a language feature vector may correspond to a vector in the embedding space. As used herein, the term "vector" is not limited to a one-dimensional array, but can refer to an array of values having any number of dimensions.

At operation 210, the system extracts features for the image. In some examples, visual features may be extracted from an input image using a ResNet variant.

At operation 215, the system generates annotation information based on the extracted features. For example, the system may produce a pixel-level segmentation mask of an area within an input image given a natural language expression (e.g., of the white chair in the image of the room). One embodiment of the present disclosure provides a stochastic attentive fusion network that can discover comprehensive multi-modal alignments and enhance segmentation accuracy. Embodiments of the present disclosure produce sharp and clean segmentation masks without post-processing.

At operation 220, the user views the image along with the annotation information. In some examples, the user may manipulate the image based on the annotation information (e.g., by selecting the object identified by the annotation information in an image editing application and performing image edits accordingly).

FIG. 3 shows an example of image annotation based on language queries according to aspects of the present disclosure. The example shown includes an image 300 including first object 305, second object 310, and third object 315. The different objects in the image 300 may be referred to by referral expressions including first query 320, second query 325, and third query 330.

Specifically, image 300 shows an example of a room with multiple pieces of furniture. First object 305 is a couch, second object 310 is another couch, and third object 315 is a chair. If a user provides first query 325 ("a rightmost couch"), the systems and methods described herein may provide an image annotation including an image mask outlining the first object 305. If a user provides second query 320 ("a couch with arms"), the systems and methods described herein may provide an image annotation including an image mask outlining the second object 310. If a user provides third query 330 ("a white chair"), the systems and methods described herein may provide an image annotation including an image mask outlining the third object 315.

Because there are several similar objects in the room, conventional referring image segmentation systems may not be able to provide fast and accurate image masks corresponding to the objects in the image without significant post-processing. However, embodiments of the present disclosure may accurately identify the objects without post-processing.

Figure 4:
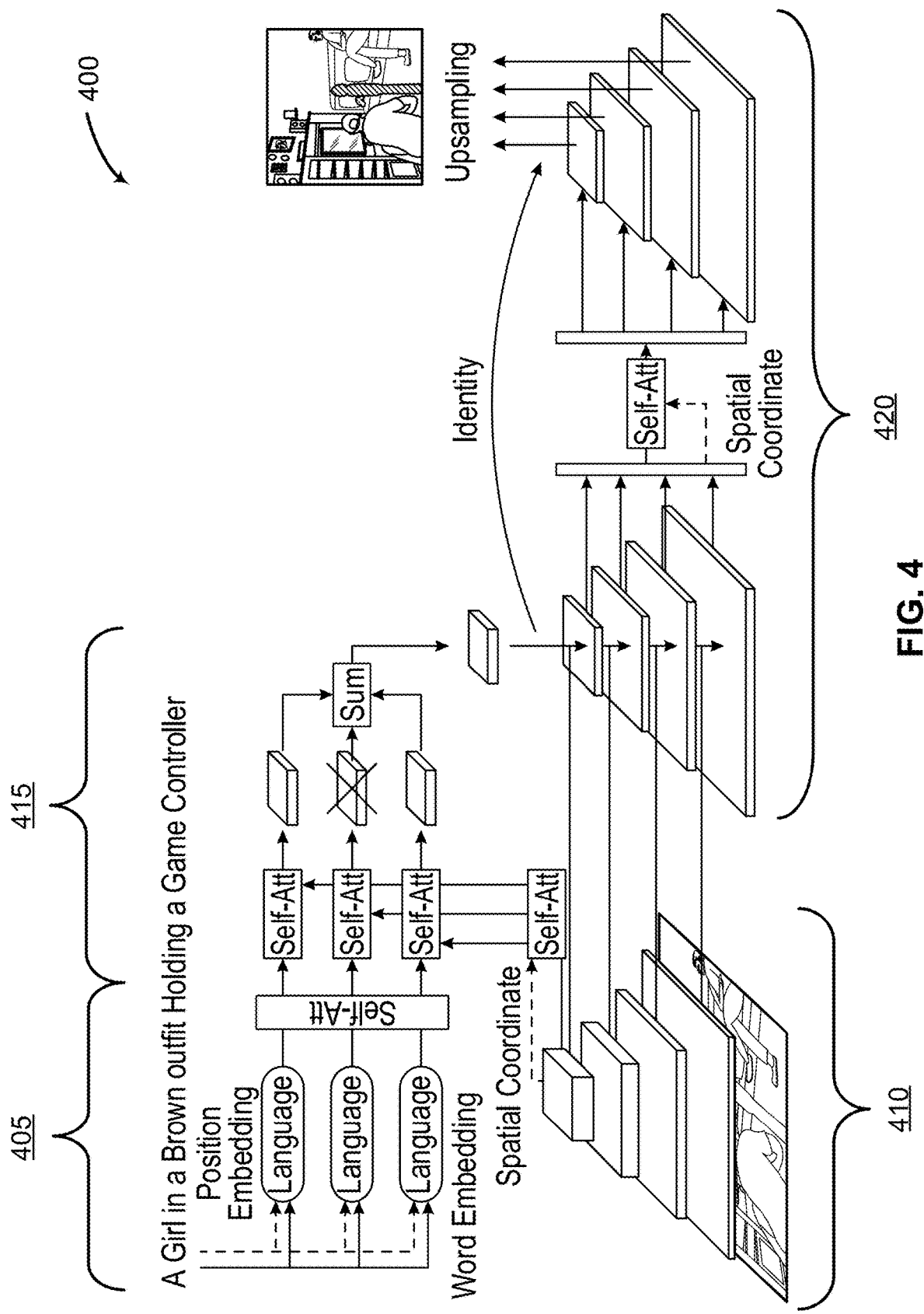
FIG. 4 shows an example of an apparatus for image processing according to aspects of the present disclosure.

FIG. 4 shows an example of an apparatus for image processing according to aspects of the present disclosure. The apparatus may include a server 400, which may be an example of, or include aspects of, the corresponding element or elements described with reference to FIG. 1. Server 400 may include language feature extractor 405, image feature extractor 410, fusion module 415, and decoder 420.

First, language features may be extracted from a referral expression (e.g., "A girl in a brown outfit holding a game controller") by language feature extractor 405, while image features are extracted from a corresponding image using image feature extractor 410. The language features and the image features are then combined using fusion module 415, after which the decoder 420 generates an image mask corresponding to the referral expression. Herein, the term "image feature vector" refers to an array (or matrix) of values that represent the visual features of an image.

Language Feature Extraction

Language feature extractor 405 may extract multiple language feature vectors for a referral expression. In some cases, each of the set of language feature vectors includes a different number of dimensions (i.e., the number of values in each of the language feature vectors is different). Thus, language feature extractor 405 may embed the same referral expression into multiple different embedding spaces of different dimensionality. For example, in one embodiment, embedding spaces of 500, 700, 1000, and 1200 dimensions (as illustrated with reference to FIG. 6). However, this is only an example, and other numbers of dimensions may also be used.

The term "language feature vector" refers to a representation the referral expression in an embedding space (i.e., a vector space). A language feature vector can be represented as an array (or matrix) of values corresponding to a basis of the embedding space. The number of values in the array is equal to the dimensionality of the embedding space. Each language feature vector represents features corresponding to each individual word of the referral expression, and may also include positional or contextual information representing relationships between the words.

Using multiple language embeddings with different dimensionality improves the extent to which the network can discover different cross-modal connections (i.e., relationships between the language features and the image features), and also enables the use of stochastic regularization during training. That is, one or more of the language feature vectors (or the resulting cross-modal self-attention vectors) may be dropped during training to prevent overfitting.

A word embedding is a learned representation for text where words that have the same meaning have a similar representation. Glove and Word2vec are examples of systems for obtaining a vector representation of words. GloVe is an unsupervised algorithm for training a network using on aggregated global word-word co-occurrence statistics from a corpus. Similarly, a Word2vec model may include a shallow neural network trained to reconstruct the linguistic context of words. GloVe and Word2vec models may take a large corpus of text and produces a vector space as output. In some cases, the vector space may have a large number of dimensions. Each word in the corpus is assigned a vector in the space. Word vectors are positioned in the vector space in a manner such that similar words are located nearby in the vector space. In some cases, an embedding space may include syntactic or context information in additional to semantic information for individual words.

In some examples, the language feature extractor 405 includes a language self-attention module. Language feature extractor 405 may apply the language self-attention module to the embedded referral expression in each of the set of embedding spaces, where each of the set of feature vectors includes an output of the language self-attention module corresponding to one of the set of embedding spaces. A language self-attention module may capture information related to the interactions between different words.

In some cases, language feature extractor 405 may also provide position information to the language self-attention module. In some examples, language feature extractor 405 may receive audio information associated with the input image, and may identify the referral expression based on the audio information. Language feature extractor 405 may be an example of, or include aspects of, the corresponding element or elements described with reference to FIG. 5.

In one example, each word in a language expression may be encoded as a one-hot vector and projected onto an embedding space in $C_e$ dimensions using a learnable lookup table. Unlike methods that employ RNN components to encode the sequential nature of word vectors, certain embodiments of the present disclosure augment a positional encoding at each word position to maintain the semantics of individual words. The positional encoding may be performed by embedding the position of each word onto the same embedding space by another learnable lookup table initialized by a sinusoidal function. Let W, $P \in \mathbb{R}^{L \times C_e}$ be a collection of words and positional embeddings for an expression Q, respectively. Let $w_l, p_l \in \mathbb{R}^{C_e}, l \in \{1, \ldots, L\}$ denote the l-th embedding for word and position, respectively. A final lingual feature is the summation of embeddings, i.e., $e_l = w_l + p_l \in \mathbb{R}^{C_e}$.

Image Feature Extraction

Image feature extractor 410 extracts an image feature vector from an input image (e.g., using a CNN or another suitable image feature extraction network). Image feature extractor 410 may also apply an image self-attention module to the output of the CNN, where the image feature vector includes an output of the image self-attention module. For example, the CNN may produce a first set of features, which can be refined by the self-attention module. In some examples, image feature extractor 410 identifies spatial coordinate information for the input image, and provides the spatial coordinate information to the image self-attention module.

Here, the term "feature extractor" or "encoder" refers to a neural network component that takes various inputs (e.g., a natural language query, an image, or an image mask) and outputs a vector or matrix of numbers (i.e., a feature vector). By contrast, a "decoder" refers to a network component that takes a feature vector and outputs an image mask.

In one example, image feature extractor 410 extracts image information for the input image from each of a set of layers of a CNN. Image feature extractor 410 may provide the image information from each of the set of layers of the CNN to one of a set of layers of a decoder 420. In some examples, the image information from each of the set of layers of the CNN includes a different spatial resolution and a different number of channels. Image feature extractor 410 may be an example of, or include aspects of, the corresponding element or elements described with reference to FIG. 5.

In one embodiment, the described network takes multi-modal inputs: an image I and a natural language expression Q. In some examples, visual features may be extracted from an input image using a ResNet variant. Visual-spatial features are constructed by concatenating spatial coordinates to visual features in a channel direction to specify the location information of each feature explicitly. Spatial coordinates, e.g. 8-dimensional, consist of normalized horizontal and vertical position information in each of 3 dimensions and normalized 2-dimensional height and width information of a whole image. Formally, let $F \in \mathbb{R}^{H \times W \times C_v}$ and $f_p \in \mathbb{R}^{C_v}, p \in \{1, 2, \ldots, H\} \times \{1, 2, \ldots, W\}$ be a visual feature map and a visual feature vector at a certain location p, respectively. The visual-spatial feature is produced by the concatenation of visual and spatial features and is denoted by $v_p = [f_p, s_p] \in \mathbb{R}^{C_v+8}$, where $s_p$ is, for example, an 8-dimensional spatial feature.

Feature Fusion

Fusion module 415 combines the language feature vectors with the image feature vector to produce a set of self-attention vectors. Fusion module 415 may also combine the self-attention vectors to produce a multi-modal feature vector. In some examples, the multi-modal feature vector includes a sum of the set of self-attention vectors. In some cases, fusion module 415 may exclude a self-attention vector of the set of self-attention vectors based on a random selection.

Fusion module 415 may also generate interpretation information for the image mask, where the interpretation information includes an attention value for each word of the referral expression corresponding to each of the set of language feature vectors. Fusion module 415 may be an example of, or include aspects of, the corresponding element or elements described with reference to FIG. 5.

Embodiments of the present disclosure provide a joint multi-modal feature representation by broadcasting and concatenating both a visual-spatial feature of each location and a lingual feature of each word. One embodiment of the present disclosure describes algorithms for a two-stage multi-modal attention module with two parts—modality-specific self-attention and multi-modal self-attention. Self-attention is applied to each visual-spatial and lingual feature independently to obtain modality-specific representations. Each self-attention module maps each feature to a $C_a$-dimensional space for both modalities as follows:

$$\hat{v}_p = SA^v(v_p) \in \mathbb{R}^{C_a} \quad (1)$$

$$\hat{e}_l = SA^e(e_l) \in \mathbb{R}^{C_a} \quad (2)$$

where $SA^*(\bullet)$ ($* \in \{v, e\}$) denotes a self-attention module for either visual-spatial or lingual features. The collections of $\hat{v}_p$ and $\hat{e}_l$ are denoted by $\hat{V} \in \mathbb{R}^{H \times W \times C_a}$ and $\hat{E} \in \mathbb{R}^{L \times C_a}$, respectively.

Since self-attentive feature maps $\hat{V}$ and $\hat{E}$ have different dimensions, multi-modal features are constructed by broadcasting both features and concatenating them at every pair of spatial location and word position. Then, a multimodal feature $m_{pl}$ corresponding to a spatial location p and a word position l is computed as follows, $$m_{pl} = [\hat{v}_p, \hat{e}_l] \in \mathbb{R}^{C_a+C_a} \quad (3)$$

and a multi-modal feature map is $M = \{m_{pl} | \forall p, \forall l\} \in \mathbb{R}^{L \times H \times W \times (C_a+C_a)}$.

The next step is to conduct multi-modal self-attention on the multi-modal feature map M. The described network generates a set of (key, query, value) triplets, denoted by (k, q, v), using 3D convolutions as follows:

$$k = \text{Conv}_{key}^{3 \times 3 \times 3}(M) \in \mathbb{R}^{L \times H \times W \times C_b} \quad (4)$$

$$q = \text{Conv}_{query}^{3 \times 3 \times 3}(M) \in \mathbb{R}^{L \times H \times W \times C_b} \quad (5)$$

$$v = \text{Conv}_{value}^{3 \times 3 \times 3}(M) \in \mathbb{R}^{L \times H \times W \times C_b} \quad (6)$$

For training stability and computational efficiency of 3D convolutions, one embodiment of the present disclosure decomposes previous operations into a set of 2D and 1D convolutions for spatial location and word position, respectively $$k^v = \text{Conv}_{key}^{3 \times 3}(m_{\bullet l}) \in \mathbb{R}^{H \times W \times C_b} \quad (7)$$

$$k^e = \text{Conv}_{key}^{3}(m_{p \bullet}) \in \mathbb{R}^{L \times C_b} \quad (8)$$

$$k_{pl} = k_p^v + k_l^e \in \mathbb{R}^{C_b} \quad (9)$$

where $m_{\bullet l} = \{m_{pl} | \forall p\}$ and $m_{p \bullet} = \{m_{pl} | \forall l\}$. Note that $q_{pl}$ and $v_{pl}$ are obtained in the same way.

The multi-modal self-attentive feature is computed as follows, $$\hat{m}_{pl} = m_{pl} + \sum_{p',l'} f(k_{p',l'}, q_{pl}) v_{p',l'} \quad (10)$$

where $f(\bullet, \bullet)$ is a similarity function. $f(x, y) = \text{Softmax}(x \bullet y)$ is used here where $\bullet$ denotes a dot-product operator. It computes the correlation between all combinations of pixels and words.

Self-attentive features are averaged over words and a final cross-modal feature is computed as follows:

$$\hat{m}_p = \frac{1}{L} \sum_l m_{pl} \quad (11)$$

where $\hat{M} = \{\hat{m}_p | \forall p\} \in \mathbb{R}^{H \times W \times C_b}$.

The described two-stage multi-modal attention mechanism may capture the complex cross-modal long-range dependency with marginal computational overhead. The computational cost of the modality-specific self-attention is $O(C(H^2W^2+L^2))$, which is negligible compared to the cost of multi-modal self-attention, which costs $O(CH^2W^2L^2)$. In one example, if multi-modal self-attention is applied directly, a channel dimension for a multi-modal self-attention is $C_v+8+C_e$, which is larger than $C_a+C_a$.

Stochastic Multi-Modal Attention

One embodiment of the present disclosure incorporates multiple embeddings for lingual features to discover more comprehensive multi-modal interactions with visual-spatial features. One embodiment of the present disclosure employs multiple learnable lookup tables that perform multiple embeddings on different dimensions. Such a heterogeneous embedding focuses on different linguistic semantics, which are complementary to each other. The visual-spatial features are combined with the lingual features in different embedding spaces. A two-stage multi-modal attention is conducted independently to obtain a set of multi-modal self-attentive feature maps $\{\hat{M}_i | i \in 1, \ldots, N\}$, where N denotes the number of language embeddings.

To take advantage of the multiple language embeddings, embodiments of the present disclosure employ stochastic regularization during training. Stochastic regularization allows a model to fully exploit multiple embeddings and discover latent cross-modal alignments. One embodiment of the present disclosure disregards a subset of embeddings randomly during training while using all branches during test with reduced amount of activations due to dropout rate r. Stochastic regularization may prevent the model from over-fitting and increase model capacity, and reduce training time.

One embodiment of the present disclosure compiles a set of multi-modal features given by multiple embeddings, and learns a set of weight parameters, $w_i \in [0,1]$ ($i=1, \ldots, N$), for multi-modal attentive feature maps $\hat{M}_i$. A final weighted multi-modal feature may be obtained by:

$$\tilde{M} = \sum_{i=1}^{N} e_i w_i \hat{M}_i \quad (12)$$

where $e_i \in [0, 1]$ is an approximated Bernoulli random variable, which may have a constraint of $\tilde{M} = \sum_{i=1}^{N} e_i = N(1-r)$ for training and $e_i = 1-r$ for testing.

Decoder

Decoder 420 decodes the multi-modal feature vector to produce an image mask indicating a portion of the input image corresponding to the referral expression. Decoder 420 may also identify spatial coordinate information for the input image. Decoder 420 may also apply a decoder self-attention module to the spatial coordinate information and an output of each layer. Decoder 420 may also upsample an output of the decoder self-attention module, where the image mask is based on upsampling.

Upsampling refers to the process of resampling in a multi-rate digital signal processing system. Upsampling can include expansion and filtering (i.e., interpolation). It may be performed on a sequence of samples of a signal (e.g., an image), and may produce an approximation of a sequence obtained by sampling the signal at a higher rate or resolution. The process of expansion refers to the process of inserting additional data points (e.g., zeros or copies of existing data points). Interpolation refers to the process of smoothing out the discontinuities (e.g., with a lowpass filter). In some cases, the filter is called an interpolation filter.

After computing the multi-modal feature maps, a variation of a balanced feature pyramid network may be used to enhance the quality of the representations in a progressive manner. A balanced feature pyramid network may take on two types of inputs—a weighted multi-modal self-attentive feature map $\tilde{M}$ and an original visual feature map V. In each block, one embodiment of the present disclosure performs a refinement procedure using two feature maps independently—one is from the previous block ($\tilde{M}$ for the first block) and one is from the corresponding level (l) of an encoder, $V_l$. The summation of the two outputs fuses multi-modal information effectively. The output may be up-sampled from the previous stage before the next block by a scaling factor, e.g. a factor of 2, to match the size of feature maps.

A balanced feature pyramid network may employ an additional feature pyramid structure to aggregate and distribute multi-level semantic features for computing a final segmentation mask. The additional feature pyramid structure may equalize the output feature maps from all stages in a refinement module and average them. Then, a spatial self-attention may be applied to an aggregated feature map and a resulting feature map is rescaled to multiple sizes in order to match the ones in individual stages of the refinement module. There is an identity connection from the refinement module to the rescaled feature maps after self-attention. In addition to the original balanced feature pyramid network, one embodiment of the present disclosure concatenates spatial coordinates, e.g. eight dimensional spatial coordinates, before self-attention to preserve spatial information of the features.

After obtaining the multi-scale feature maps from the balanced feature pyramid network, the described network may integrate multi-scale decoders, which produce segmentation likelihood maps from individual multi-scale feature representations. A single decoder may be employed to handle each scale and the number of layers in each decoder depends on up-sampling rates. Although some approaches apply a post-processing step for refinement, embodiments of the present disclosure do not apply post-processing. The whole framework may be trained end-to-end, producing referring image segmentation without post processing.

Attention Modules

Figure 5:
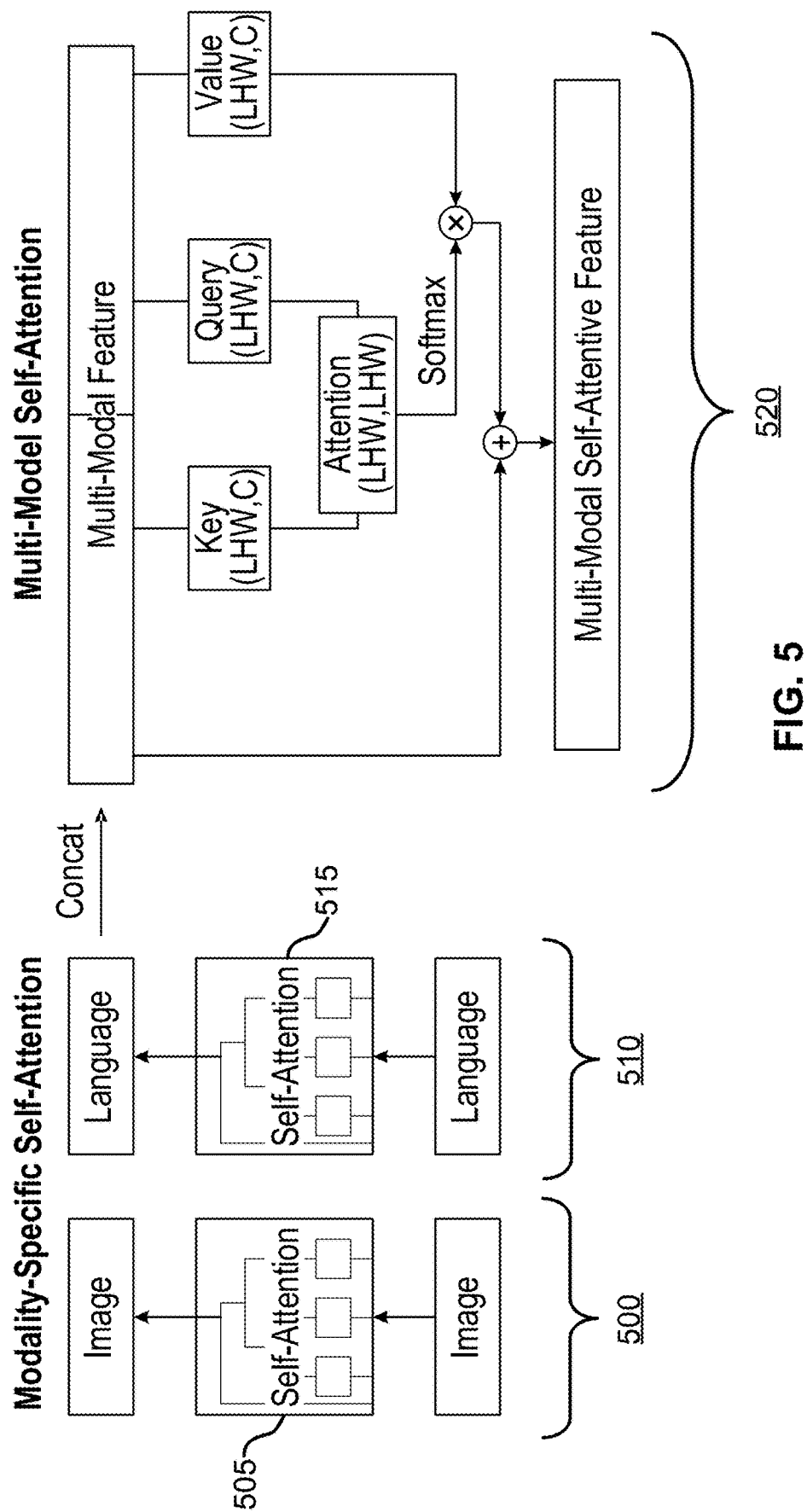
FIG. 5 shows an example of attention modules according to aspects of the present disclosure.

FIG. 5 shows an example of attention modules according to aspects of the present disclosure. The example shown includes image feature extractor 500, language feature extractor 510, and fusion module 520.

Image feature extractor 500, language feature extractor 510, and fusion module 520 may be an example of, or include aspects of, the corresponding elements described with reference to FIG. 4. Image feature extractor 500 may include self-attention layer 505. Language feature extractor 510 may include self-attention layer 515.

As described above with reference to FIG. 4, a referring image segmentation network may include a language feature extractor, a fusion module, and a decoder. Each of these components may include a self-attention module. The image feature extractor 500 and language feature extractor 510 may each include a single-mode self-attention module, which may be concatenated into a multi-modal feature vector.

The fusion module 520 may then apply a self-attention mechanism to combine the multi-modal feature vector into a multi-modal self-attentive feature vector, which may then be passed to the decoder.

Interpretation Information

FIG. 6 shows an example of interpretation information according to aspects of the present disclosure. The example shown includes segmentation results 600 and attention matrix 605.

In some examples, an embedding is determined for each word of a natural language query, and segmentation results 600 represent segmentation results for several single word embeddings from the query "a smiling man with a small infant wearing a beige shirt". For example, a first image may include a mask for a word embedding for the word "man", a second image may include a mask for a word embedding for "infant", a third image may include a mask for a word embedding for "wearing", and a fourth image may include a mask for a word embedding for "shirt."

In some examples, a referring image segmentation system may provide intermediate heat maps such as the segmentation results 600 to aid in interpretation of the overall result. For example, the segmentation results 600 may aid in understanding how each word in a referral expression contributes to the end result.

Another example of interpretation information is represented in attention matrix 605. Specifically, attention matrix 605 represents a heatmap visualization of word attention over multiple word embeddings. As described above, multiple word embeddings may be used, each of which has a different number of dimensions. Each different number of dimensions may capture different information (e.g., regarding the relationships among words). So for example, one dimensional level may apply more importance to the word "smiling" while others may focus more on the word "small" or "beige."

Referring Image Segmentation Method

Figure 7:
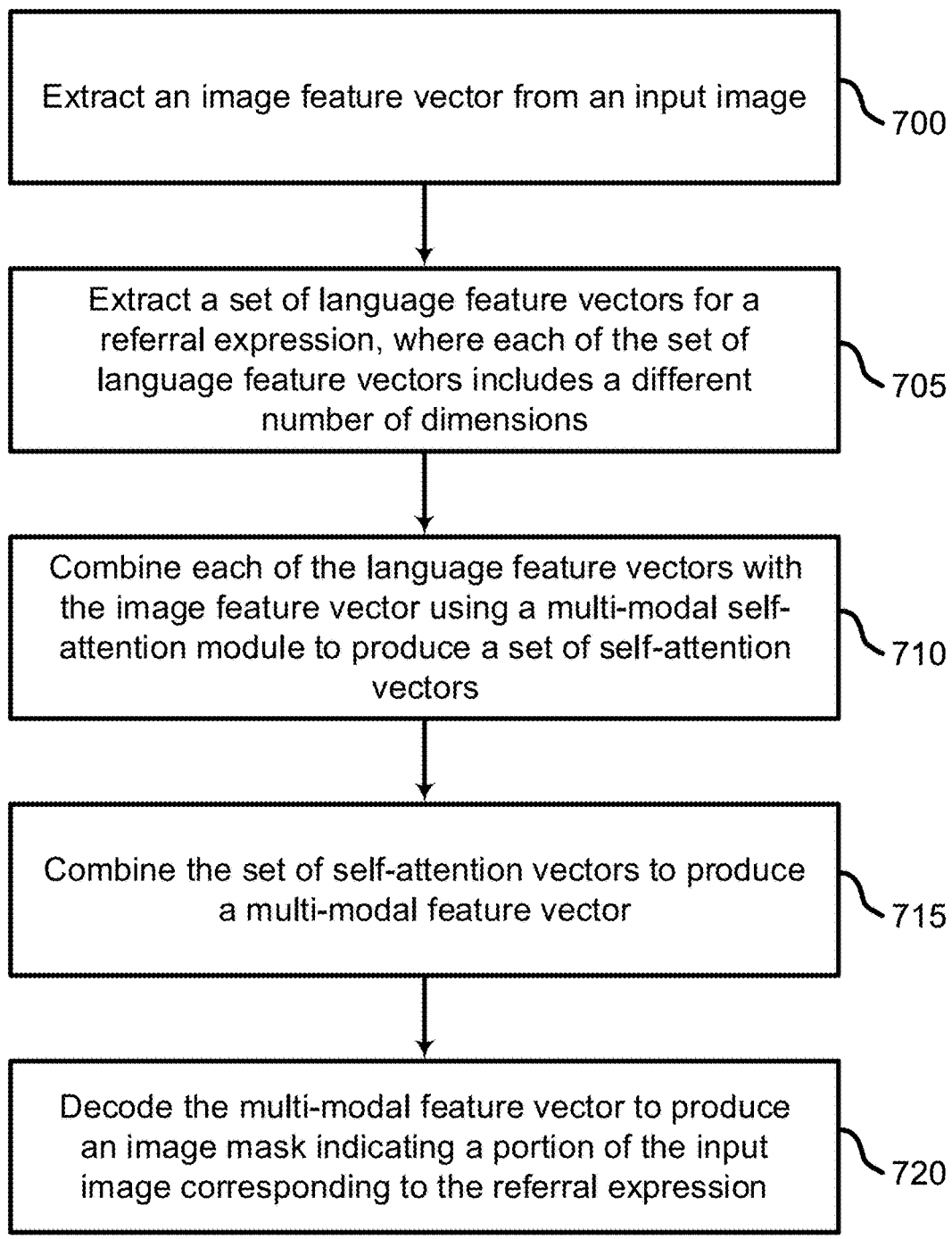
FIG. 7 shows an example of a process for image annotation according to aspects of the present disclosure.

FIG. 7 shows an example of a process for image annotation according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

Embodiments of the present disclosure herein provide a stochastic attentive fusion network that performs complicated visual-lingual alignments for referring image segmentation tasks. One embodiment of the present disclosure provides algorithms which learn to discover accurate image-language interactions effectively through a modality-specific self-attention module and a fusion module. Another embodiment relates to a combination of multi-modal representations and stochastic regularization for comprehensive fusion.

At operation 700, the system extracts an image feature vector from an input image. In some cases, the operations of this step may refer to, or be performed by, an image feature extractor as described with reference to FIGS. 4 and 5.

In some examples, visual features may be extracted from an input image using a ResNet variant. Visual-spatial features are constructed by concatenating spatial coordinates to visual features in a channel direction to specify the location information of each feature explicitly. Spatial coordinates, e.g. 8-dimensional coordinates, consist of normalized horizontal and vertical position information in each of 3 dimensions and normalized 2-dimensional height and width information of a whole image. The visual-spatial feature may be produced by the concatenation of visual and spatial features.

At operation 705, the system extracts a set of language feature vectors for a referral expression, where each of the set of language feature vectors includes a different number of dimensions. In some cases, the operations of this step may refer to, or be performed by, a language feature extractor as described with reference to FIGS. 4 and 5.

In one example, each word in a language expression may be encoded as a one-hot vector and projected onto an embedding space using a learnable lookup table. Certain embodiments of the present disclosure augment a positional encoding at each word position to maintain the semantics of individual words. The positional encoding is performed by embedding the position of each word onto the same embedding space by another learnable lookup table initialized by a sinusoidal function. A final lingual feature may include the summation of the two embeddings.

At operation 710, the system combines each of the language feature vectors with the image feature vector (e.g., using a fusion module) to produce a set of self-attention vectors. In some cases, the operations of this step may refer to, or be performed by, a fusion module as described with reference to FIGS. 4 and 5.

At operation 715, the system combines the set of self-attention vectors to produce a multi-modal feature vector. In some cases, the operations of this step may refer to, or be performed by, a fusion module as described with reference to FIGS. 4 and 5.

Embodiments of the present disclosure provide a joint multi-modal feature representation by broadcasting and concatenating both a visual-spatial feature of each location and a lingual feature of each word. One embodiment of the present disclosure describes algorithms for a two-stage multi-modal attention module with two parts—modality-specific self-attention and multi-modal self-attention. Self-attention is applied to each visual-spatial and lingual feature independently to obtain modality-specific representations.

At operation 720, the system decodes the multi-modal feature vector to produce an image mask indicating a portion of the input image corresponding to the referral expression. In some cases, the operations of this step may refer to, or be performed by, a decoder as described with reference to FIG. 4.

After computing the multi-modal feature maps, a variation of a balanced feature pyramid network may be used to enhance the quality of the representations in a progressive manner. A balanced feature pyramid network may take on two types of inputs—a weighted multi-modal self-attentive feature map and an original visual feature map. In each block, embodiments of the present disclosure perform a refinement procedure using two feature maps independently—one is from the previous block and one is from the corresponding level of an encoder. The summation of the two outputs fuses multi-modal information effectively. The output may be up-sampled from the previous stage before the next block by a scaling factor, e.g. a factor of 2, to match the size of feature maps.

Training and Evaluation

Figure 8:
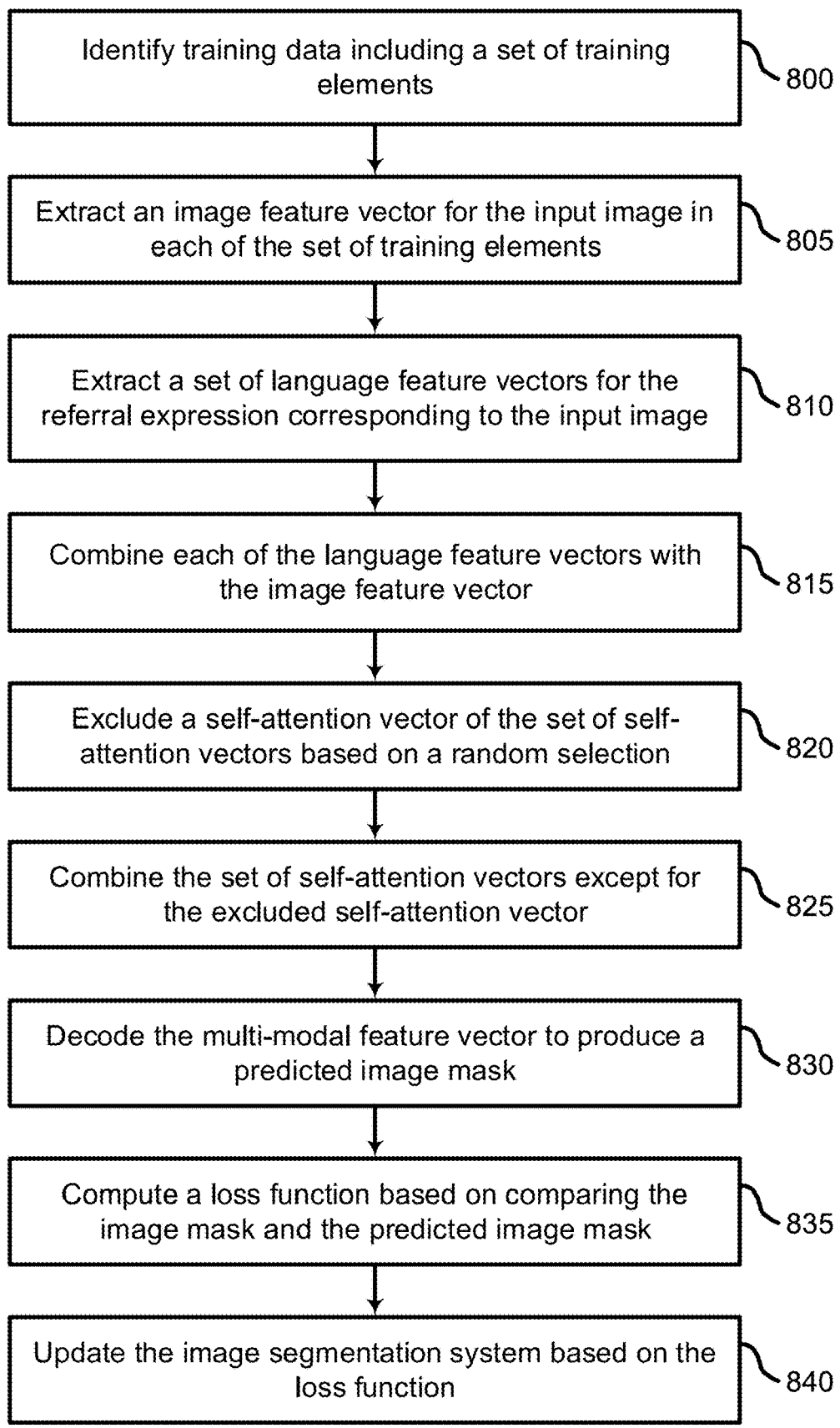
FIG. 8 shows an example of a process for training a network for image processing according to aspects of the present disclosure.

FIG. 8 shows an example of a process for training a network for image processing according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 800, the system identifies training data including a set of training elements, where each of the set of training elements includes an input image, a referral expression, and an image mask. In some cases, the operations of this step may refer to, or be performed by, a training component as described with reference to FIG. 1.

Various embodiments of the present disclosure use, for example, one of three datasets for referring image segmentation tasks: RefCOCO, RefCOCO+, and RefCOCOg, which are based on COCO images. The language expressions in RefCOCO and RefCOCO+ are collected by an interactive two-player game. There are no restrictions about the language expressions in the RefCOCO dataset while the location information is not allowed in the referral expressions for the images of the RefCOCO+ dataset.

RefCOCO includes 142,209 referral expressions for 50,000 objects in 19,994 images and RefCOCO+ may include 141,564 referral expressions for 49,856 objects in 19,992 images. The language expressions have an average length of 3.61 for RefCOCO and 3.53 for RefCOCO+.

RefCOCOg is collected by a crowdsourcing solution which includes 85,474 expressions for 54,822 objects in 26,711 images. RefCOCOg contains more natural and complex expressions and average length of expressions is 8.43 words, which is longer than the other datasets.

At operation 805, the system extracts an image feature vector for the input image in each of the set of training elements. In some cases, the operations of this step may refer to, or be performed by, an image feature extractor as described with reference to FIGS. 4 and 5. At operation 810, the system extracts a set of language feature vectors for the referral expression corresponding to the input image, where each of the set of language feature vectors includes a different number of dimensions. In some cases, the operations of this step may refer to, or be performed by, a language feature extractor as described with reference to FIGS. 4 and 5.

Embodiments of the present disclosure employ a backbone network pre-trained on the ImageNet dataset. In one example, input images may be resized to 320×320. Maximum length of words L may be 20, and individual words are embedded to each of $C_e$-dimensional spaces, where $C_e \in \{1200, 1000, 800, 500\}$. Both modality-specific features $C_a$ and the multi-modal features $C_b$ are represented by dimensional vectors, e.g. 512-dimensional. In another example, an optimizer trains the described network with a mini-batch consisting of 16 images. A learning rate may be initialized as $2 \times 10^{-5}$ and decays by a factor of 10 at every 30 epochs. The dropout rate r may be 0.25.

At operation 815, the system combines each of the language feature vectors with the image feature vector using a multi-modal self-attention network module to produce a set of self-attention vectors. In some cases, the operations of this step may refer to, or be performed by, a fusion module as described with reference to FIGS. 4 and 5.

At operation 820, the system excludes a self-attention vector of the set of self-attention vectors based on a random selection. In some cases, the operations of this step may refer to, or be performed by, a fusion module as described with reference to FIGS. 4 and 5.

At operation 825, the system combines the set of self-attention vectors except for the excluded self-attention vector to produce a multi-modal feature vector. In some cases, the operations of this step may refer to, or be performed by, a as described with reference to a fusion module as described with reference to FIGS. 4 and 5.

At operation 830, the system decodes the multi-modal feature vector to produce a predicted image mask. In some cases, the operations of this step may refer to, or be performed by, a decoder as described with reference to FIG. 4.

At operation 835, the system computes a loss function based on comparing the image mask and the predicted image mask for each of the set training elements. In some cases, the operations of this step may refer to, or be performed by, a training component as described with reference to FIG. 1.

At operation 840, the system updates the image segmentation system based on the loss function. In some cases, the operations of this step may refer to, or be performed by, a training component as described with reference to a training component as described with reference to FIG. 1.

Embodiments of the present disclosure may employ two standard evaluation metrics to evaluate segmentation accuracy—the intersection of union (IoU) and the precision (prec@X). The IoU means the intersection over the union between the areas of a predicted segmentation result and a ground truth. The prec@X denotes the percentage of correctly segmented images out of all test images, given an IoU threshold $X \in \{0.5, 0.6, 0.7, 0.8, 0.9\}$.

Embodiments of the present disclosure outperform conventional methods on all tested datasets. In particular, the described network is more effective on RefCOCOg, which contains longer and richer query expressions. This demonstrates that the described systems and methods capture complex long-range dependencies within and across image inputs and text inputs effectively. The described algorithms improve significantly compared to conventional methods at high precision points. Thus, the described systems and methods are desirable for applications that provide accurate masks on images given queries in text.

Specifically, the described systems and methods identify accurate object boundaries referred to by corresponding natural language expressions. In some embodiments, results are based on a single embedding of multi-modal features without stochastic fusion. The described systems and methods produce accurate segmentation results on diverse queries, which implies that they are effective in representing various attributes of objects in an image including location, appearance, relation to other objects, etc.

Experiments may be conducted on different ablation models on the RefCOCOg dataset. An example baseline model may include only the second stage multi-modal self-attention using a single word embedding and a balanced feature pyramid network without a self-attention component. Some embodiments of the present disclosure augment each of these components by including modality-specific attention, stochastic attention, and self-attention in a balanced feature pyramid network, either with or without spatial coordinate augmentation before the self-attention step. Each component may improve segmentation accuracy in terms of both precision and IoU.

The effect of dropout rate on stochastic multi-modal attention may be analyzed by fixing the number of word embeddings to 4 and testing multiple dropout rates, $r \in \{0, 0.25, 0.5, 0.75\}$. Experiments show that stochastic regularization results in performance gain. In one example, a dropout rate of 0.25 produces the best performance while the results are stable over a wide range of dropout rates.

Accordingly, the present disclosure includes the following embodiments.

A method for referring image segmentation is described. Embodiments of the method may include extracting an image feature vector from an input image, extracting a plurality of language feature vectors for a referral expression, wherein each of the plurality of language feature vectors comprises a different number of dimensions, combining each of the language feature vectors with the image feature vector using a fusion module to produce a plurality of self-attention vectors, combining the plurality of self-attention vectors to produce a multi-modal feature vector, and decoding the multi-modal feature vector to produce an image mask indicating a portion of the input image corresponding to the referral expression.

An apparatus for image processing is described. The apparatus may include a processor, memory in electronic communication with the processor, and instructions stored in the memory. The instructions may be operable to cause the processor to extract an image feature vector from an input image, extract a plurality of language feature vectors for a referral expression, wherein each of the plurality of language feature vectors comprises a different number of dimensions, combine each of the language feature vectors with the image feature vector using a fusion module to produce a plurality of self-attention vectors, combine the plurality of self-attention vectors to produce a multi-modal feature vector, and decode the multi-modal feature vector to produce an image mask indicating a portion of the input image corresponding to the referral expression.

A non-transitory computer readable medium storing code for image processing is described. In some examples, the code comprises instructions executable by a processor to: extract an image feature vector from an input image, extract a plurality of language feature vectors for a referral expression, wherein each of the plurality of language feature vectors comprises a different number of dimensions, combine each of the language feature vectors with the image feature vector using a fusion module to produce a plurality of self-attention vectors, combine the plurality of self-attention vectors to produce a multi-modal feature vector, and decode the multi-modal feature vector to produce an image mask indicating a portion of the input image corresponding to the referral expression.

Some examples of the method, apparatus, and non-transitory computer readable medium described above may further include applying a convolutional neural network (CNN) to the input image. Some examples may further include applying an image self-attention module to the output of the CNN, wherein the image feature vector comprises an output of the image self-attention module. Some examples of the method, apparatus, and non-transitory computer readable medium described above may further include identifying spatial coordinate information for the input image. Some examples may further include providing the spatial coordinate information to the image self-attention module.

Some examples of the method, apparatus, and non-transitory computer readable medium described above may further include embedding the referral expression into a plurality of embedding spaces using a plurality of language embedding modules. Some examples may further include applying a language self-attention module to the embedded referral expression in each of the plurality of embedding spaces, wherein each of the plurality of feature vectors comprises an output of the language self-attention module corresponding to one of the plurality of embedding spaces.

Some examples of the method, apparatus, and non-transitory computer readable medium described above may further include embedding position information for each word of the referral expression into each of the plurality of embedding spaces. Some examples may further include providing the position information to the language self-attention module. In some examples, the multi-modal feature vector comprises a sum of the plurality of self-attention vectors.

Some examples of the method, apparatus, and non-transitory computer readable medium described above may further include extracting image information for the input image from each of a plurality of layers of a CNN. Some examples may further include providing the image information from each of the plurality of layers of the CNN to one of a plurality of layers of a decoder. Some examples may further include identifying spatial coordinate information for the input image. Some examples may further include applying a decoder self-attention module to the spatial coordinate information and an output of each of the plurality of layers of the decoder. Some examples may further include upsampling an output of the decoder self-attention module, wherein the image mask is based on upsampling. In some examples, the image information from each of the plurality of layers of the CNN comprises a different spatial resolution and a different number of channels.

Some examples of the method, apparatus, and non-transitory computer readable medium described above may further include generating interpretation information for the image mask based on the fusion module, wherein the interpretation information comprises an attention value for each word of the referral expression corresponding to each of the plurality of language feature vectors.

Some examples of the method, apparatus, and non-transitory computer readable medium described above may further include receiving audio information associated with the input image. Some examples may further include identifying the referral expression based on the audio information.

Some examples of the method, apparatus, and non-transitory computer readable medium described above may further include receiving a search query comprising the referral expression. Some examples may further include identifying the input image based on the search query. Some examples may further include applying a visual indicator to the input image based on the image mask, wherein the visual indicator corresponds to an object in the referral expression.

Some examples of the method, apparatus, and non-transitory computer readable medium described above may further include applying a visual indicator to the input image based on the image mask, wherein the visual indicator corresponds to an object in the referral expression. Some examples may further include receiving an editing command associated with the visual indicator. Some examples may further include performing the image editing command.

A method for referring image segmentation is described. Embodiments of the method may include identifying training data comprising a plurality of training elements, wherein each of the plurality of training elements comprises an input image, a referral expression, and an image mask, extracting an image feature vector for the input image in each of the plurality of training elements, extracting a plurality of language feature vectors for the referral expression corresponding to the input image, wherein each of the plurality of language feature vectors comprises a different number of dimensions, combining each of the language feature vectors with the image feature vector using a multi-modal self-attention network module to produce a plurality of self-attention vectors, excluding a self-attention vector of the plurality of self-attention vectors based on a random selection, combining the plurality of self-attention vectors except for the excluded self-attention vector to produce a multi-modal feature vector, and decoding the multi-modal feature vector to produce a predicted image mask.

An apparatus for image processing is described. The apparatus may include a processor, memory in electronic communication with the processor, and instructions stored in the memory. The instructions may be operable to cause the processor to identify training data comprising a plurality of training elements, wherein each of the plurality of training elements comprises an input image, a referral expression, and an image mask, extract an image feature vector for the input image in each of the plurality of training elements, extract a plurality of language feature vectors for the referral expression corresponding to the input image, wherein each of the plurality of language feature vectors comprises a different number of dimensions, combine each of the language feature vectors with the image feature vector using a multi-modal self-attention network module to produce a plurality of self-attention vectors, exclude a self-attention vector of the plurality of self-attention vectors based on a random selection, combine the plurality of self-attention vectors except for the excluded self-attention vector to produce a multi-modal feature vector, and decode the multi-modal feature vector to produce a predicted image mask.

A non-transitory computer readable medium storing code for image processing is described. In some examples, the code comprises instructions executable by a processor to: identify training data comprising a plurality of training elements, wherein each of the plurality of training elements comprises an input image, a referral expression, and an image mask, extract an image feature vector for the input image in each of the plurality of training elements, extract a plurality of language feature vectors for the referral expression corresponding to the input image, wherein each of the plurality of language feature vectors comprises a different number of dimensions, combine each of the language feature vectors with the image feature vector using a multi-modal self-attention network module to produce a plurality of self-attention vectors, exclude a self-attention vector of the plurality of self-attention vectors based on a random selection, combine the plurality of self-attention vectors except for the excluded self-attention vector to produce a multi-modal feature vector, and decode the multi-modal feature vector to produce a predicted image mask.

Some examples of the method, apparatus, and non-transitory computer readable medium described above may further include computing a loss function based on comparing the image mask and the predicted image mask for each of the plurality training elements. Some examples may further include updating the image segmentation system based on the loss function. In some examples, updating the image segmentation system comprises modifying parameters of a neural network based on the loss function.

An apparatus for referring image segmentation is described. Embodiments of the apparatus may include a language feature extractor configured to extract an image feature vector from an input image, an image feature extractor configured to extract a plurality of language feature vectors for a referral expression, wherein each of the plurality of language feature vectors comprises a different number of dimensions, a fusion module configured to combine each of the language feature vectors with the image feature vector to produce a plurality of self-attention vectors and to combine the plurality of self-attention vectors to produce a multi-modal feature vector, and a decoder configured to decode the multi-modal feature vector to produce an image mask indicating a portion of the input image corresponding to the referral expression.

In some examples, the language feature extractor comprises a language self-attention module. In some examples, the image feature extractor comprises a CNN. In some examples, the image feature extractor comprises an image self-attention module. In some examples, the decoder comprises a decoder self-attention module.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image processing, comprising:
receiving an input image and a referral expression corresponding to a target object in the input image;
generating an image mask corresponding to the target object based on an image feature vector representing the input image and a plurality of language feature vectors, wherein each of the language feature vectors comprises a representation of the referral expression in one of a plurality of language embedding spaces having a different number of dimensions from each other; and
displaying the target object by overlaying the image mask on the input image.

2. The method of claim 1, wherein generating the image mask comprises:
extracting the image feature vector from the input image;
extracting the plurality of language feature vectors for the referral expression;
combining each of the language feature vectors with the image feature vector using a fusion module to produce a plurality of self-attention vectors;
combining the plurality of self-attention vectors to produce a multi-modal feature vector; and
decoding the multi-modal feature vector to produce an image mask corresponding to the target object.

3. The method of claim 2, wherein:
the multi-modal feature vector comprises a sum of the plurality of self-attention vectors.

4. The method of claim 1, further comprising:
applying a convolutional neural network (CNN) to the input image; and
applying an image self-attention module to an output of the CNN, wherein the image feature vector comprises an output of the image self-attention module.

5. The method of claim 4, further comprising:
identifying spatial coordinate information for the input image; and
providing the spatial coordinate information to the image self-attention module.

6. The method of claim 1, further comprising:
embedding the referral expression into each of the language embedding spaces, wherein each of the language embedding spaces has a different number of spatial dimensions; and
applying a language self-attention module to each of the embedded referral expressions to produce the language feature vectors.

7. The method of claim 6, further comprising:
embedding position information for each word of the referral expression for each of the embedded referral expressions; and
providing the position information to the language self-attention module.

8. The method of claim 1, further comprising:
extracting image information for the input image from each of a plurality of layers of a CNN;
providing the image information from each of the plurality of layers of the CNN to one of a plurality of layers of a decoder;
identifying spatial coordinate information for the input image;
applying a decoder self-attention module to the spatial coordinate information and an output of each of the plurality of layers of the decoder; and
upsampling an output of the decoder self-attention module, wherein the image mask is based on upsampling.

9. The method of claim 1, further comprising:
generating interpretation information for the image mask based on a fusion module, wherein the interpretation information comprises an attention value for each word of the referral expression corresponding to each of the plurality of language feature vectors.

10. The method of claim 1, further comprising:
receiving audio information associated with the input image; and
identifying the referral expression based on the audio information.

11. The method of claim 1, further comprising:
receiving a search query comprising the referral expression;
identifying the input image based on the search query; and
applying a visual indicator to the input image based on the image mask, wherein the visual indicator corresponds to the target object.

12. The method of claim 1, further comprising:
applying a visual indicator to the input image based on the image mask, wherein the visual indicator corresponds to an object in the referral expression;
receiving an editing command associated with the visual indicator; and
performing an image edit based on the editing command.

13. An apparatus for image processing, comprising:
a language feature extractor configured to extract an image feature vector from an input image;
an image feature extractor configured to extract a plurality of language feature vectors for a referral expression;
a fusion module configured to combine each of the language feature vectors with the image feature vector to produce a plurality of self-attention vectors and to combine the plurality of self-attention vectors to produce a multi-modal feature vector; and
a decoder configured to decode the multi-modal feature vector to produce an image mask indicating a portion of the input image corresponding to the referral expression.

14. The apparatus of claim 13, wherein:
each of the plurality of language feature vectors comprises a different number of dimensions.

15. The apparatus of claim 13, wherein:
the language feature extractor comprises a language self-attention module.

16. The apparatus of claim 13, wherein:
the image feature extractor comprises an image self-attention module.

17. The apparatus of claim 13, wherein:
the decoder comprises a decoder self-attention module.

18. An apparatus comprising:
a processor; and
a memory including instructions executable by the processor to:
receive an input image and a referral expression corresponding to a target object in the input image;
generate an image mask corresponding to the target object based on an image feature vector representing the input image and a plurality of language feature vectors, wherein each of the language feature vectors comprises a representation of the referral expression in one of a plurality of language embedding spaces having a different number of dimensions from each other; and
display the target object by overlaying the image mask on the input image.

19. The apparatus of claim 18, wherein the instructions are further executable to:
extract the image feature vector from the input image;
extract the plurality of language feature vectors for the referral expression;
combine each of the language feature vectors with the image feature vector using a fusion module to produce a plurality of self-attention vectors;
combine the plurality of self-attention vectors to produce a multi-modal feature vector; and
decode the multi-modal feature vector to produce an image mask corresponding to the target object.

20. The apparatus of claim 18, wherein the instructions are further executable to:
embed the referral expression into each of the language embedding spaces, wherein each of the language embedding spaces has a different number of spatial dimensions; and
apply a language self-attention module to each of the embedded referral expressions to produce the language feature vectors.

* * * * *